(12) United States Patent
Hagan

(10) Patent No.: US 11,691,452 B2
(45) Date of Patent: *Jul. 4, 2023

(54) TABLET DEVICE FOR UNDERWATER OR SEVERE ENVIRONMENT

(71) Applicant: Mark Lloyd Hagan, Nyack, NY (US)

(72) Inventor: Mark Lloyd Hagan, Nyack, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,821

(22) Filed: May 24, 2022

(65) Prior Publication Data

US 2022/0281262 A1 Sep. 8, 2022

Related U.S. Application Data

(63) Continuation-in-part of application No. 16/680,581, filed on Nov. 12, 2019, now Pat. No. 11,338,608.

(60) Provisional application No. 62/759,994, filed on Nov. 12, 2018.

(51) Int. Cl.
| | |
|---|---|
| *B43L 1/00* | (2006.01) |
| *B63C 11/02* | (2006.01) |
| *G09B 29/00* | (2006.01) |
| *B43L 3/00* | (2006.01) |

(52) U.S. Cl.
CPC .................. *B43L 1/00* (2013.01); *B43L 3/005* (2013.01); *B63C 11/02* (2013.01); *G09B 29/004* (2013.01)

(58) Field of Classification Search
None
See application file for complete search history.

(56) References Cited

U.S. PATENT DOCUMENTS

| | | | |
|---|---|---|---|
| 2,883,770 | A | 4/1959 | Lieb |
| 2,990,308 | A | 6/1961 | Goldstein |
| 3,781,536 | A | 12/1973 | Naeseth et al. |
| 4,083,136 | A | 4/1978 | Zelenko |
| 4,255,873 | A | 3/1981 | Eberle |
| 4,797,107 | A | 1/1989 | Hatta et al. |
| 4,960,399 | A | 10/1990 | Lyon |
| 4,995,011 | A | 2/1991 | Spiesberger |
| 4,995,015 | A | 2/1991 | Chiang |
| 5,083,242 | A | 1/1992 | Piotrowski |
| 5,148,718 | A | 9/1992 | Kakuguchi et al. |
| 5,361,169 | A | 11/1994 | Deal |
| 5,447,215 | A | 9/1995 | Volkmar et al. |
| 5,531,481 | A | 7/1996 | Wiltshire |
| 5,956,291 | A | 9/1999 | Nehemiah et al. |
| 6,040,042 | A | 3/2000 | Dalgleish et al. |
| 6,098,793 | A | 8/2000 | Jaksha |
| 6,116,484 | A | 9/2000 | Allen |
| 6,161,740 | A | 12/2000 | Allen |
| 6,468,461 | B1 | 10/2002 | Sumiyoshi et al. |
| 6,652,086 | B1 | 11/2003 | Tomida et al. |

(Continued)

FOREIGN PATENT DOCUMENTS

JP H11-105488 A 4/1999

OTHER PUBLICATIONS

"Revlar Waterproof Synthetic Paperguide" (2018).
"Synaps OM | Synthetic Polyester Paper" (May 3, 2018).

*Primary Examiner* — Alexander S Thomas
(74) *Attorney, Agent, or Firm* — Paul Teng

(57) ABSTRACT

A tablet-like device is configured to have a slightly negative buoyancy and to hold a sheet of waterproof synthetic paper, or another removable, waterproof recording sheet, onto which notes or messages or sketches can be recorded via a writing implement, in an underwater or marine environment, or another extreme or severe environment.

15 Claims, 20 Drawing Sheets

(56) References Cited

U.S. PATENT DOCUMENTS

| | | |
|---|---|---|
| 6,863,940 B2 | 3/2005 | Silver et al. |
| 7,144,254 B2 | 12/2006 | Meyerrose |
| 7,264,477 B1 | 9/2007 | Hagan |
| 7,431,579 B2 | 10/2008 | Downing |
| 7,731,501 B2 | 6/2010 | Hagan |
| 7,874,843 B2 | 1/2011 | Hagan |
| 8,357,447 B2 | 1/2013 | Quintens et al. |
| 8,454,370 B2 | 6/2013 | Hagan |
| 8,974,876 B2 | 3/2015 | Quintens et al. |
| 9,104,370 B2 | 8/2015 | Hagan |
| 2004/0146699 A1 | 7/2004 | Dalgleish et al. |
| 2004/0197758 A1 | 10/2004 | Langford |
| 2013/0180936 A1 | 7/2013 | Subbaraman et al. |
| 2016/0075844 A1 | 3/2016 | Cooper et al. |
| 2018/0282947 A1 | 10/2018 | Mattingly et al. |

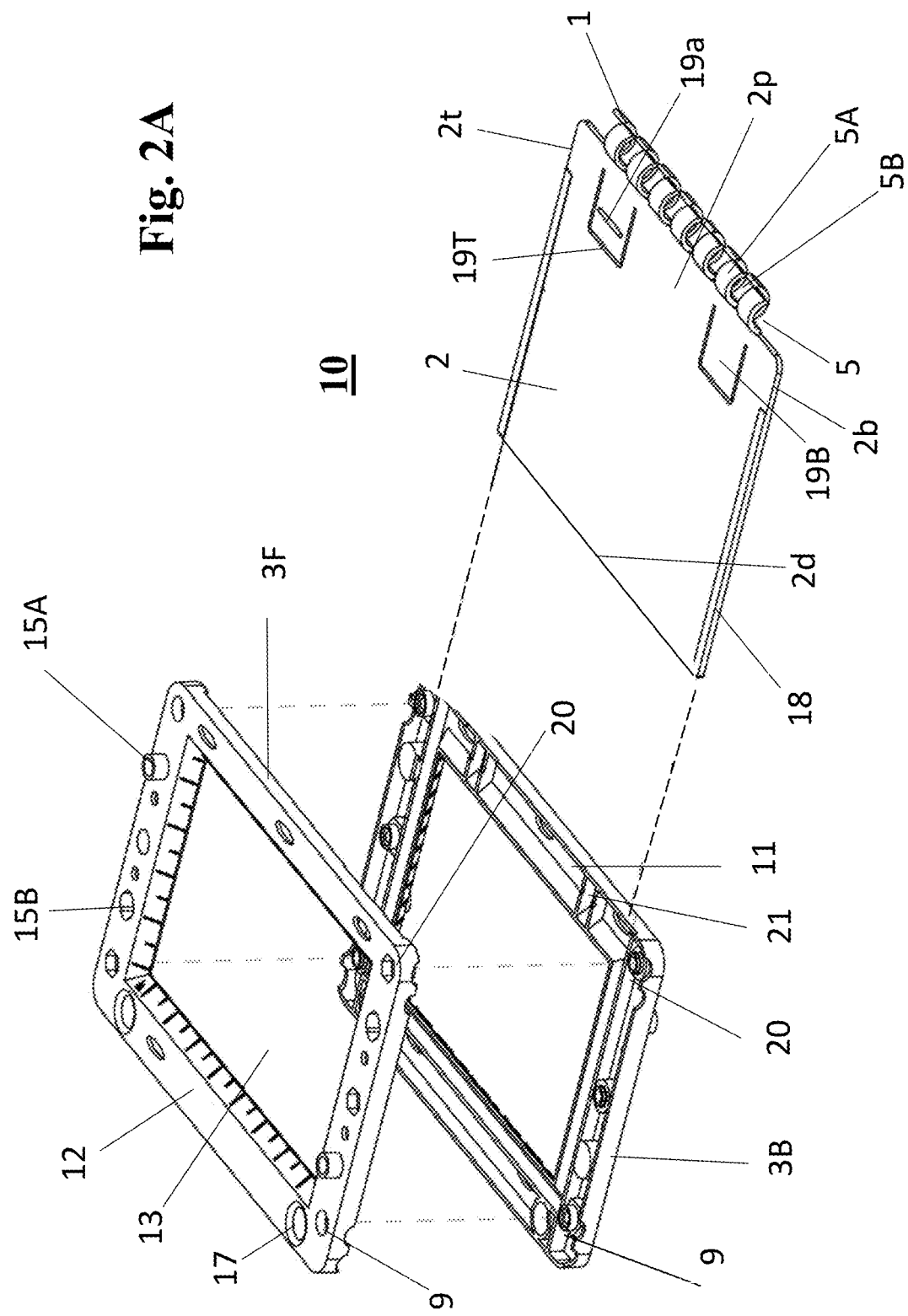

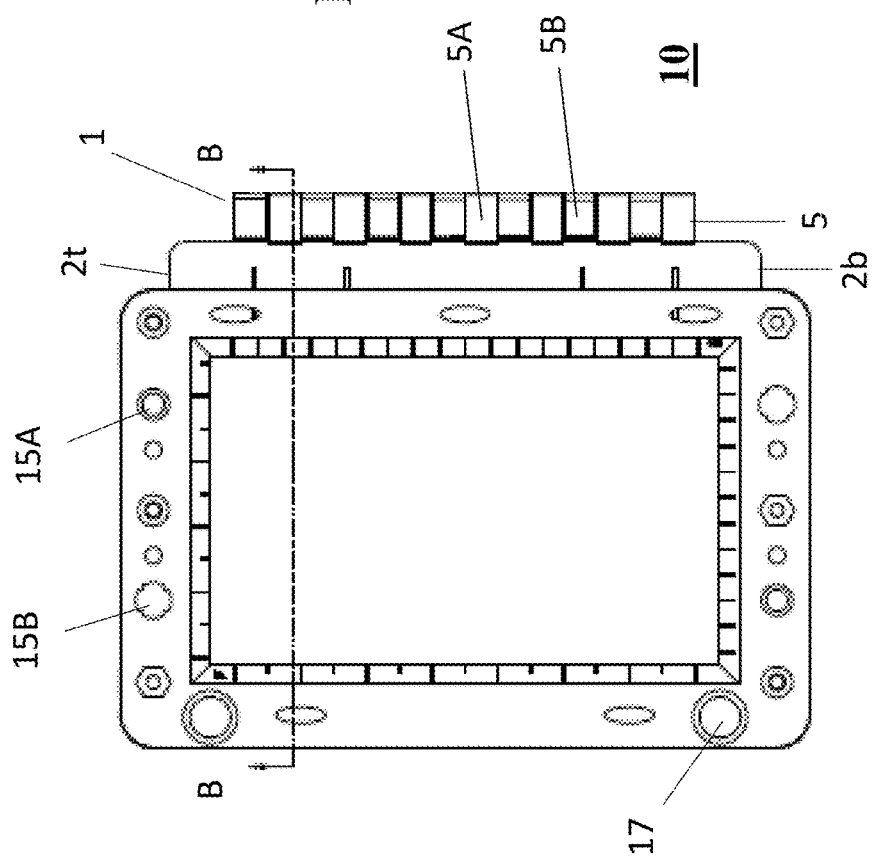
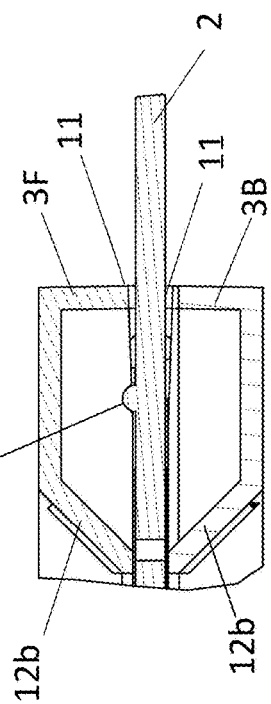
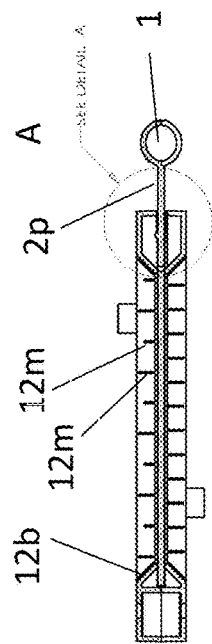

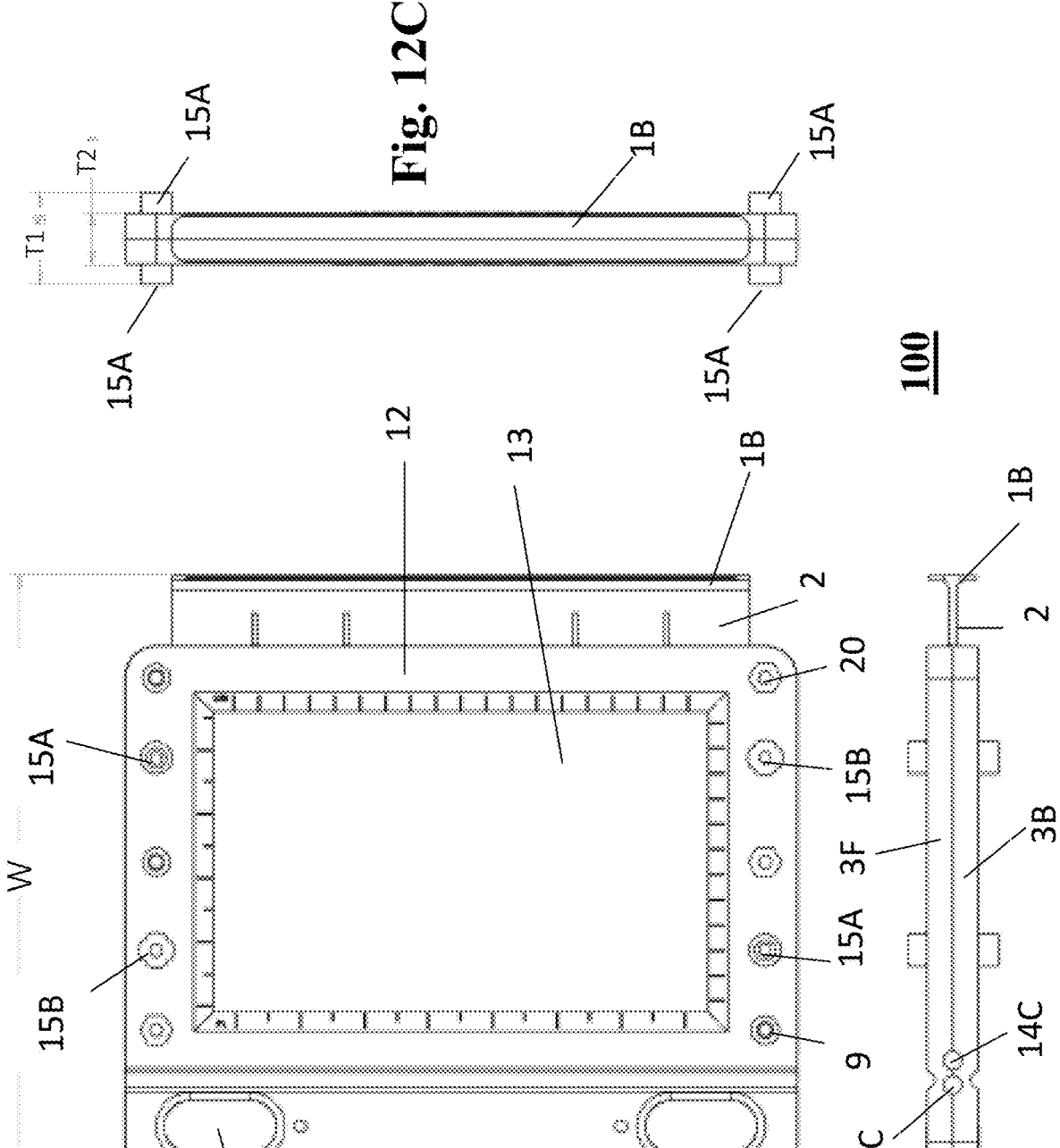

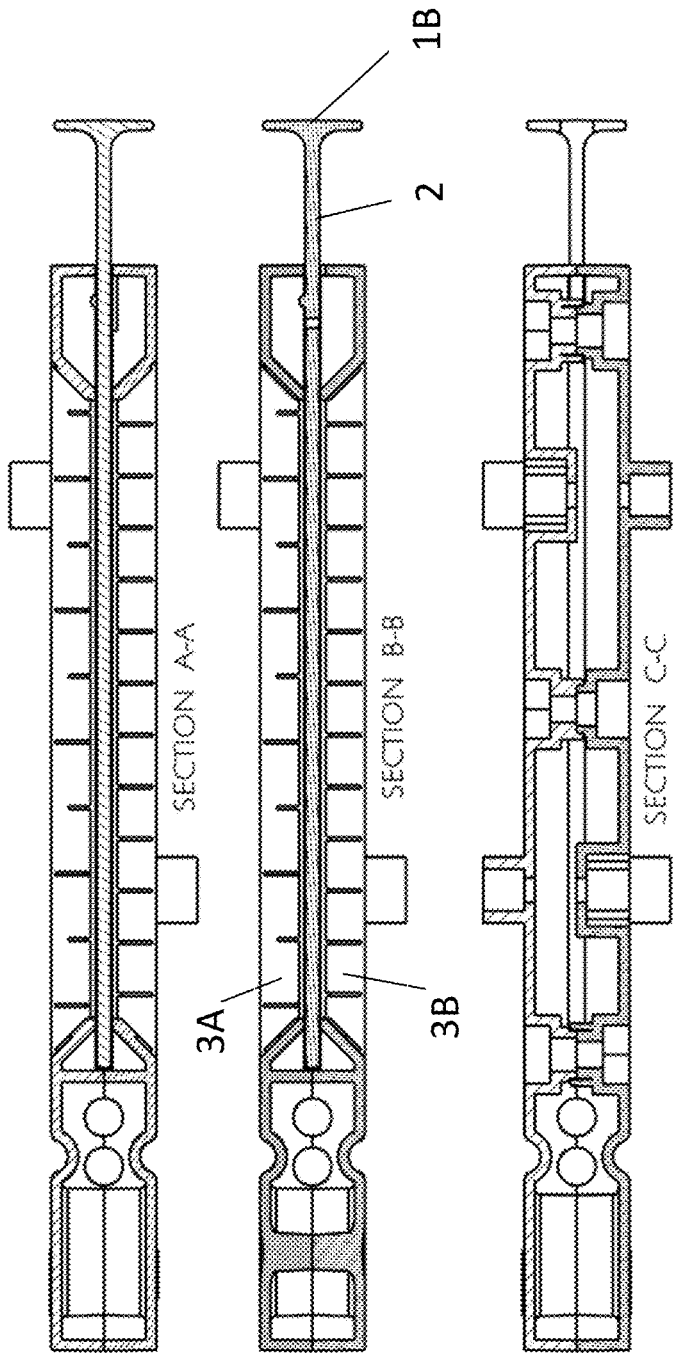

TABLET DEVICE FOR UNDERWATER OR SEVERE ENVIRONMENT

CROSS REFERENCE TO RELATED APPLICATIONS

This disclosure is a continuation-in-part of U.S. patent application Ser. No. 16/680,581, filed Nov. 12, 2019 (now U.S. Pat. No. 11,338,608 B2) which claims the benefit of U.S. Provisional Application No. 62/759,994, filed Nov. 12, 2018.

TECHNICAL FIELD

This application relates to a tablet-like device, and more specifically, a device that is configured to hold a sheet of waterproof synthetic paper, or another waterproof recording sheet, onto which notes, messages, markings, sketches, etc., can be recorded via a writing implement (or otherwise recorded), in an underwater or marine environment, or another extreme environment.

BACKGROUND

There are many reasons a scuba diver may need to write or draw underwater. For example, a diver may need or wish to communicate with other divers. In addition, the diver may desire to record notes, to aid in gathering reference material, architectural drafting for marine construction, artistic rendering, etc.

Dive slates are limited in the amount that they can record by the size of the slate. When the slate is full, new writing can only be added by erasing all previous work. In urgent situations this erasing time can be inconvenient. Accordingly, it has been proposed to use a clipboard-type slate which permits the option of multiple sheets of waterproof material underwater. However, such arrangement is awkward because in an underwater or marine environment the pages can stick together and would typically be difficult to manipulate, especially if the diver is wearing gloves. Multiple page slates also cannot be reused until all previous work has been erased.

Electronic equipment is relatively expensive and can be vulnerable and/or unreliable in an underwater environment.

SUMMARY

A tablet device can be configured to be suitable for use in an underwater or marine environment, or another extreme environment, without the drawbacks of an electronic device, in such environment. In particular, each unit of such a tablet device may be configured for use along with a removable, waterproof note-recording medium sheet, in an arrangement that is particularly useful in an underwater or marine environment, or another severe or extreme environment where it is difficult to communicate orally or to record notes efficiently by use of conventional means. Various embodiments and examples are described.

The removable, waterproof note-recording medium used in the tablet device may preferably be sheets of waterproof synthetic paper, to take advantage of recent developments in synthetic waterproof paper to permit such paper to withstand high temperatures such as during laser printing. When such waterproof synthetic paper, virtually any type of information useful during a dive can be pre-printed via laser printing on the sheet. Such option provides the diver with a cost saving of one-to-two orders of magnitude (for example, less than one dollar per sheet printed at home or in one's own office using off-the-shelf printing equipment versus $10 to $30 per sheet onto a plastic slate using specialized industrial printing equipment not readily available to consumers and not cost effective for printing small quantities. Such sheets of synthetic waterproof paper enable divers to work with their own personal pre-printed material underwater. Such material or information may include, for example, a map, a checklist, templates (e.g., for matching objects or terrain that the user is likely to encounter on a dive), instructions, other information that may be relevant in the aforementioned environment, etc. Further, the various embodiments and examples of a tablet device disclosed herein are also advantageous over conventional dive slates for the reason that the environmental impact of using synthetic waterproof paper is much less than that of thick plastic slates. The synthetic waterproof paper utilized in the tablet devices disclosed herein is reusable and recyclable The tablet device enables a diver to bring such pre-printed material conveniently on a dive and is configured to permit the user to visually discern information on such pre-printed material as well as to permit the user to add notes, messages, markings, sketches, etc. onto one or both half-sheets. In an embodiment of such a tablet device, a support palette is provided to support a removable sheet of pre-printed material or other waterproof note-recording medium, onto which notes, messages, markings, sketches, etc., can be recorded with a writing implement (such as pencil).

Further, the support palette and the tablet device are preferably configured such that when the sheet is folded into two halves and placed on the support palette, a front half of the sheet is supported by the front surface of the support palette, and the rear half of the sheet is supported by the back surface of the support palette, and the information on each half-sheet is visually accessible. When the removable, waterproof note-recording medium sheet is a sheet of waterproof synthetic paper, such sheet is typically amenable to be folded readily, thus enabling the front half-sheet to cover most of the front surface of the support palette and the rear half-sheet to cover most of the back surface of the support palette. As mentioned, information may be pre-printed on the sheet prior to the dive, and such pre-printed information may be printed on either or both half-sheets.

Such support palette bearing the two halves of the sheet supported by the front and back support surfaces, respectively, can be, in one exemplary embodiment, inserted into a side slot (configured to have a shape and size to permit the support palette to be slidably inserted into, and removed from, the frame assembly through such slot) in a frame assembly of the tablet device. In other embodiments, the support palette bearing the two halves of the sheet supported by the front and back support surfaces, respectively, is borne by a clamshell-like frame.

Each of such frame assemblies includes a front frame portion which is configured (similar to a picture frame) to enable the user to visually discern information recorded on the front half-sheet which is supported on the front surface of the support palette and moreover to record notes, messages, sketches, etc., on such front half-sheet. The frame assembly preferably also includes a rear frame portion which is configured similar to the front frame portion, to permit access to the rear half-sheet, i.e. to enable the user to visually discern information recorded on the rear half-sheet and to record notes, messages, sketches, etc., on such rear half-sheet.

In an embodiment, the frame assembly includes a front frame member and a back frame member. Such front frame member includes the aforementioned front frame portion, and the front half-sheet is held in place on the front surface of the support palette by the front frame member. Likewise, the rear half-sheet is held in place on the back surface of the support palette by the back frame member.

In another embodiment, plural tablet device units each configured for recording notes, markings, etc., with a writing implement onto at least one sheet at a time may be employed to enable a user (e.g., diver) to write as many notes or messages as needed, and each of the plural tablet device units is configured, as discussed above, to include front and back frame members, and such frame members each includes connector receptacles disposed at respective predetermined locations in a surface of the frame member. In an exemplary embodiment, each connector receptacle is configured to receive a device connector having a predetermined shape complementary to that of the connector receptacle. Thus, two tablet device units are connected by a device connector inserted in respective connector receptacles disposed in a surface of the front frame member of one unit and in connector receptacles disposed in a surface of the back frame member of the other unit.

In yet another embodiment, for each of the tablet device units, each of the front and back frame members is configured to have through-holes each disposed near a distal edge of the support palette and each configured to be penetrated by a removable ring or tie-lock of a predetermined size or smaller. The multiple tablet device units can be held together as a collection by at least two removable rings or tie-locks penetrating the respective through-holes of each of the plural tablet device units in the collection.

BRIEF DESCRIPTION OF THE DRAWINGS

The features of the subject matter of this disclosure can be more readily understood from the following detailed description with reference to the accompanying drawings wherein:

FIG. 2A shows an exploded view of the tablet device shown in FIG. 1, without a sheet of recording medium placed on the support palette;

FIG. 3A shows a top view of the tablet device shown in FIG. 1;

FIG. 3B shows a cross-sectional view along line B-B of the tablet device shown in FIG. 3A;

FIG. 3C shows a magnified view of region A of FIG. 3B;

FIG. 12A shows a top view of the tablet device shown in FIG. 11;

FIG. 12B shows a front view of the tablet device shown in FIG. 11;

FIG. 12C shows a side view of the tablet device shown in FIG. 11;

FIG. 13B shows a sectional view along line A-A of the tablet device shown in FIG. 13A;

FIG. 13C shows a sectional view along line B-B of the tablet device shown in FIG. 13A;

FIG. 13D shows a sectional view along line C-C of the tablet device shown in FIG. 13A;

DETAILED DESCRIPTION

Figure 1:
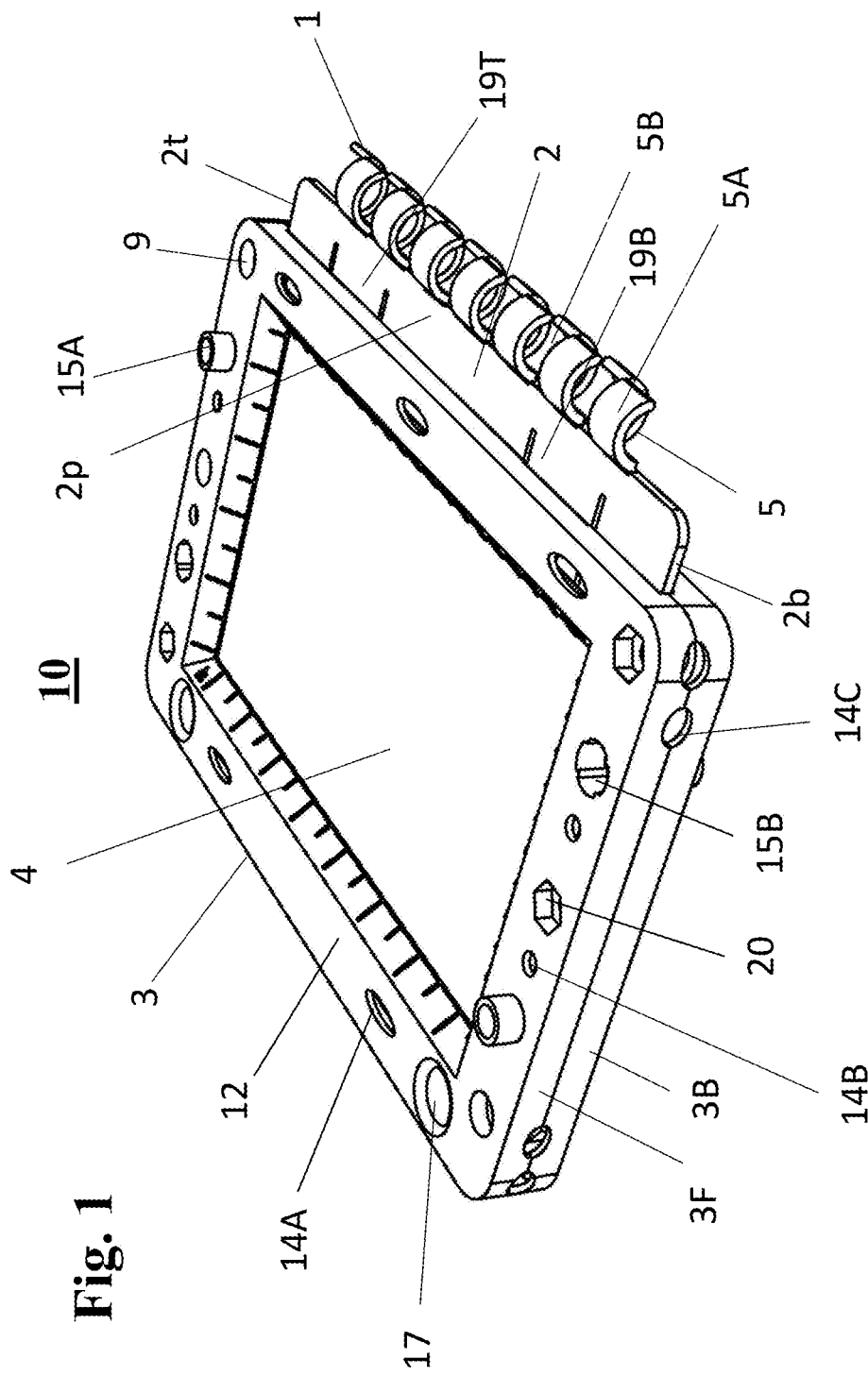
FIG. 1 shows a perspective view of a tablet device, according to an embodiment.

The following embodiments and examples (including details thereof) are set forth to aid in an understanding of the subject matter of this disclosure but are not intended to, and should not be construed to, limit in any way the invention that is claimed. In describing examples and exemplary embodiments illustrated in the drawings, specific terminology is employed for the sake of clarity in this patent specification. However, this disclosure is not intended to be limited to the specific terminology so selected and it is to be understood that each specific element includes all technical equivalents that operate in a similar manner. In addition, a detailed description of known functions and configurations will be omitted when it may obscure the subject matter of the present disclosure. In the description below, like reference numerals are used to describe the same, similar or corresponding parts in the several views of the drawing.

Figure 2B:
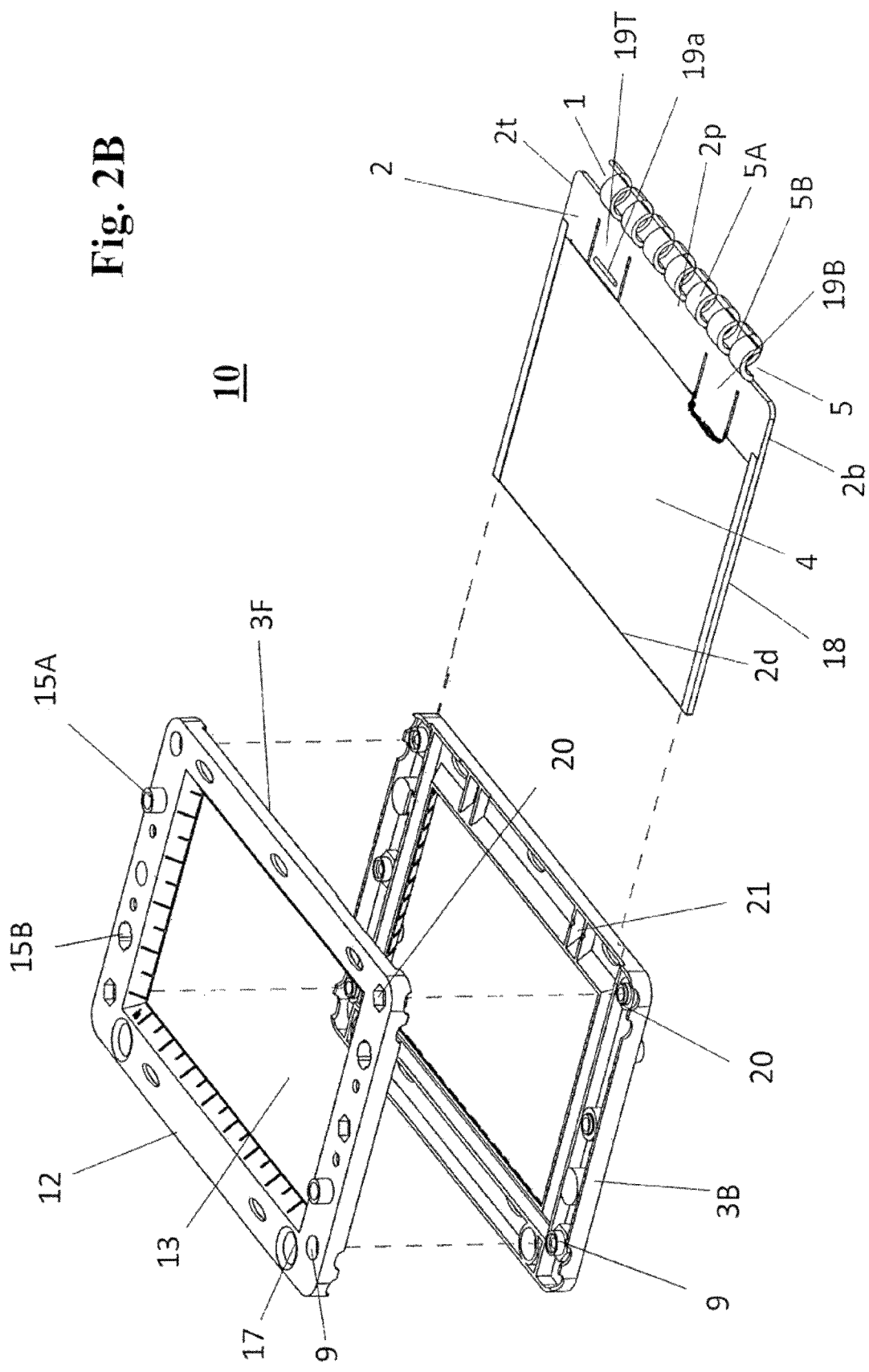
FIG. 2B shows an exploded view of the tablet device shown in FIG. 1, with a sheet of recording medium placed on the support palette.

Tablet device 10, as shown in the example of FIG. 1, includes a support palette 2 having a handle 1 and configured to support a removable, waterproof note-recording medium 4 (such as shown in FIG. 2B), and a frame assembly 3, including a front frame member 3F and a back frame member 3B. The tablet device 10, when assembled, permits the support palette 2, when grasped by handle 1, to be inserted into, and removed from, the device, as shown in FIGS. 2A-2B.

The tablet device in this disclosure is designed, through various provisions (e.g., to avoid trapping air or air bubbles) and the use of suitable materials, to have a slightly negative buoyancy at a depth of about fifty feet so that it can be very easy to manipulate underwater and will not sink or ascend rapidly if let go. In contrast, a device that is buoyant and tends to float to the surface could create a hazardous situation since divers must be very careful as to how they ascend to avoid decompression sickness. On the other hand, a slightly negative buoyancy of the tablet device renders it nearly weightless and to shed air and water so as not to encumber the diver as he or she enters or leaves the water. For example, the tablet device 10 can be made primarily of a durable polycarbonate plastic. Other plastic resin materials (such as polymethyl methacrylate (PMMA), polystyrene, etc.) that are impervious to salt water may also be used. Also, the material preferably has a bright florescent color so that the device can be located easily if it is set aside underwater where visibility can be poor. Further, the handle 1 of the support palette 2 can be made of, for example, a phosphorescent material, and the support palette 2 (e.g., a paper tray) can also be made of a phosphorescent material.

In the example shown in FIG. 2B, the recording medium sheet 4 (e.g., synthetic waterproof paper) has been folded into two halves, and a half-sheet of the recording medium 4 contacts the front surface of the support palette 2, and the other half-sheet of the recording medium 4 contacts the back surface of the support palette 2. The recording medium sheet 4 can be folded by matching corners and then placed on the support palette 2, with the one half-sheet contacting the front surface of the support palette 2, and the other half-sheet contacting the back surface of the support palette 2. Alternatively, the recording medium sheet 4 can be on the front surface (or rear surface) of the support palette 2, and then folded over a distal edge 2d of the support palette 2, onto the opposite surface of the support palette 2. In any event, one of the half-sheets is visible from one side of the tablet device 10 and the other half-sheet is visible from the opposite side of the tablet device 10

The support palette 2 may be formed as a single piece, and the handle 1 can be attached to a proximal side 2p of the support palette 2, opposite the distal side 2d of the support palette 2. The tablet can be configured to hold, for example, a standard sheet (for example, 8.5"×11", A4-sized, or any other suitable standard size, although the device may be used with smaller non-standard sheets as well, but with a risk that such non-standard sheet may slip within the device). In FIG. 2B, for example, only the top half (e.g., unfolded portion) of the folded sheet 4 may be visible.

As shown in FIGS. 2A and 2B, the support palette 2 can include guides 18 on each of a top edge 2t and a bottom edge 2b of the support palette 2 in order to align the sheet 4 on the support palette 2. The guides 18 can allow the sheet 4 to be slid into an aligned position on the support palette 2 even if, for example, the sheet 4 is initially not perpendicular to the proximal side 2p of the support palette 2. Although not shown in FIGS. 2A-2b, when the device is configured for use with half-sheets disposed on each of the front surface and back surface of the support palette 2, guides 18 are also provided on the back surface of the support palette 2 along the top edge 2t and the bottom edge 2b.

As shown in FIG. 2A, the support palette 2 can further include cutout portions (19T, 19B), cutout portion 19T having a nub 19a on the front surface of the support palette 2 and cutout portion 19B having a nub (not shown) on the back surface of the support palette 2. In order to secure the top half-sheet on the front surface of the support palette 2, the nub (and thus the cutout portion 19B) on the back surface of the support palette 2 is pressed in an upwards direction (i.e. in a direction from back surface towards front surface), and then the half-sheet is slid under the cutout portion 19B, followed by releasing the nub and the cutout portion 19B to permit the cutout portion 19B to spring back downwards (i.e. in a direction from front surface towards back surface) to grab an edge of the half sheet. Similarly, in order to secure the bottom half-sheet on the back surface of the support palette 2, the nub 19a (and thus the cutout portion 19T) on the front surface of the support palette 2 is pressed in the downwards direction, and then the bottom half-sheet is slid under the cutout portion 19T, followed by releasing the nub and cutout portion 19T to permit the cutout portion 19T to spring back downwards to grab an edge of the bottom half-sheet.

When such approach is employed, the distal end of the cutout portion 19T would be below both of the half-sheets, and the distal end of the cutout portion 19B would be above both of the half-sheets, in the example of FIG. 2B.

The front frame member 3F and the back frame member 3B of the frame assembly 3 can include respective complementary assembly connectors at multiple predetermined positions, such as at an inner side of each of the front frame member 3F and the back frame member 3B, in order to couple the front frame member 3F and the back frame member 3B to each other. As shown in the examples of FIG. 1, FIGS. 2A-2B and FIGS. 3A-3C, the complementary assembly connectors of the front frame member 3F and back frame member 3B may constitute, for example, bolt holes 20 (which may be hexagonal, or any other suitable shape) to receive a bolt, screw holes 9 to receive a screw, or any other fastener, in order to securely couple the frame members 3F and 3B. It should be understood that the screw/bolt holes of course have a shape complementary to the screws/bolts that are or are to be inserted in such holes, to permit the screws/bolts to be mated to holes. The frame members 3F and 3B can alternatively be snapped together. It is desirable to securely couple the frame members 3F and 3B for a number of reasons. For example, a diver may only have a limited time to be submerged before an oxygen supply runs out, and in order to use his or her time efficiently, the diver may desire to maximize time spent recording notes or messages or sketches onto the sheet 4, rather than worrying about the frame assembly coming apart.

As shown in the examples of FIGS. 1-3C, the frame assembly constituted by the front frame member 3F and the back frame member 3B also preferably includes apertures (e.g., elliptical apertures 14A, circular apertures 14B, otherwise rounded apertures 14C, or apertures of another suitable shape). Such apertures 14 permit air bubbles to escape from the tablet device 10 (more specifically, the frame thereof) and thereby contributes to the slightly negative buoyancy of the device. In the embodiment shown in FIGS. 1-5, pairs of adjacent rounded apertures 14C on a side of the frame assembly can have the additional utility of being an attachment point to clip on any desired object, via, for example, a cord, a strap, a lanyard, a lanyard coil, or to enable the user to secure the tablet device 10, or to secure a writing implement such as pencil (not shown) to the tablet device, etc. Such cord, strap, lanyard, lanyard coil, or other provisions can be employed to secure the device to the user, another device, a surface, etc.

In FIGS. 2A-2B, each of the front frame member 3F and the back frame member 3B includes a slot portion 11 (FIGS. 2A-2B) which forms a slot on one side of the frame assembly (e.g., corresponding to the proximal side 2p of the support palette 2 which is opposite the distal edge 2d of the support palette). Such slot formed by the slot portion 11 can have a shape and size which permits the support palette to be accommodated therein, such as by permitting the support palette 2 to be slidably inserted into the frame assembly 3 through the slot. The support palette 2 can also be removed from the frame assembly 3 through the slot. As shown in FIGS. 2A-2B, the frame assembly 3 can also include at least one support 21 configured to support the support palette 2 inserted into the frame assembly 3. The support palette 2 can be inserted into, or removed from, the frame assembly 3 by, for example, a user applying force (e.g., pushing or pulling) the handle 1 of the support palette 2. The front frame member 3F and the back frame member 3B can extend longitudinally beyond the top edge 2t and the bottom edge 2b of the support palette 2.

As shown in FIGS. 1-5, the front frame member 3F of the frame assembly 3 can include a frame portion 12 circumscribing an opening portion 13 through which information can be recorded onto a portion of the waterproof note-recording medium sheet 4 and can be visually discerned. A writing implement can contact such portion of the sheet 4 in order to record notes or markings onto the sheet. An inner perimeter edge 12b of frame portion 12 circumscribing the opening portion 13 can be beveled, and the beveled edge 12b can be scored with marks 12m separated by a predetermined unit of distance, as shown in FIGS. 1-5.

The recording medium sheet 4 can be held in place on the front surface of the support palette 2 by the front frame member 3F. More specifically, the front frame member 3F and the back frame member 3B are respectively configured preferably such that when they are assembled into the frame assembly 3 and the support palette 2 bearing the note-recording medium sheet 4 has been inserted into the tablet device, the sheet is held securely in place by the frame members to maintain a flat recording surface while preventing the sheet from becoming disengaged from the support palette 2. For example, a peripheral portion the sheet 4, surrounding the portion of the sheet 4 to which notes or markings have been or are to be applied, can be held in place against the front surface of the support palette 2 by the front frame member 3F. The removable, waterproof note-recording medium 4 may be a sheet of waterproof synthetic paper, folded over the support palette 2 to cover most of the front surface of the support palette 2 and the back surface of the support palette 2. The front frame member 3F and back frame member 3B of the frame assembly 3 can be configured to hold the sheet 4 of waterproof synthetic paper securely in place on such front and back surfaces of the support palette 2, when the support palette 2 bearing such sheet 4 of waterproof synthetic paper covering most of the front surface of the support palette 2 and the back surface of the support palette 2 has been inserted through the slot (formed by the slot portion 11) into the frame assembly 3.

The configuration of the tablet device for use with a removable, waterproof note-recording medium sheet takes advantage of recent developments in synthetic waterproof paper that can withstand the high temperatures incurred during laser printing. That is, the synthetic waterproof paper sheet 4 can bear pre-printed information thereon, and the pre-printed information can include a map, a checklist, templates, instructions, other information (such as such as depth, bottom time and limits, cylinder ending pressure, next deeper depth and next bottom time limits, a dive log, etc.) that may be relevant to the diver in the particular operating environment, etc., while also permitting the user to add notes, messages, marks, sketches via the writing instrument such as pencil (not shown) onto the sheet bearing the pre-printed information thereon. It should be noted that the pre-printed information may be useful not only to the diver but also to a dive buddy, without requiring the diver to communicate such information to the diver buddy underwater via gestures and the like.

In the embodiment shown in FIGS. 1-5, the handle 1 is configured also as an implement receptacle 5 (e.g., pencil port) coupled to, and extending from a proximal side 2p of the support palette 2. Such implement receptacle 5 is constituted by multiple upper convex parts 5A and multiple lower convex parts 5B, each convex part 5A, 5B being coupled to the proximal side of the handle 1. The upper convex parts 5A and the lower convex parts 5B are arranged alternately in an interlaced manner along the proximal side of the support palette 2. Such configuration of the implement receptacle 5 including the upper and lower convex parts 5A, 5B can be advantageous in avoiding the buildup of air bubbles in order to prevent the tablet device 10 from floating to a surface of water, when a user of the tablet device 10 is underwater. Further, such configuration of the handle 1 can enable a diver to easily grab the handle 1, even if the diver is wearing gloves, and can be advantageous is facilitating an easier manufacturing process of the handle 1 (e.g., injection molding).

As shown in FIGS. 3A-3C, the tablet device 10 may be designed to have any suitable width, length and thickness, and the tablet device 10 may include a locking mechanism 7A disposed on the support palette 2. The locking mechanism 7A may include a single bump (e.g., the nub 19 as shown in FIGS. 2A-2B) which is configured to cause the support palette 2 to remain locked while being utilized underwater, for example. The "lock and release" mechanism 7 can be a simple pressure fitting in the support palette 2. The handle 1 can be used to trigger the mechanism 7 that can add a lock and release feature to prevent the sheet 4 from accidentally releasing during use. As shown in FIG. 3C, which is a magnified view of the region A of the cross-sectional view of FIG. 3B, the edges of the slot formed by the slot portion 11 may be wider at an opening at which the support palette supporting the sheet 4 can be inserted, and then taper in a direction towards the frame assembly 3, to facilitate the entrance of the support palette 2 and locking mechanism 7A.

Figure 4:
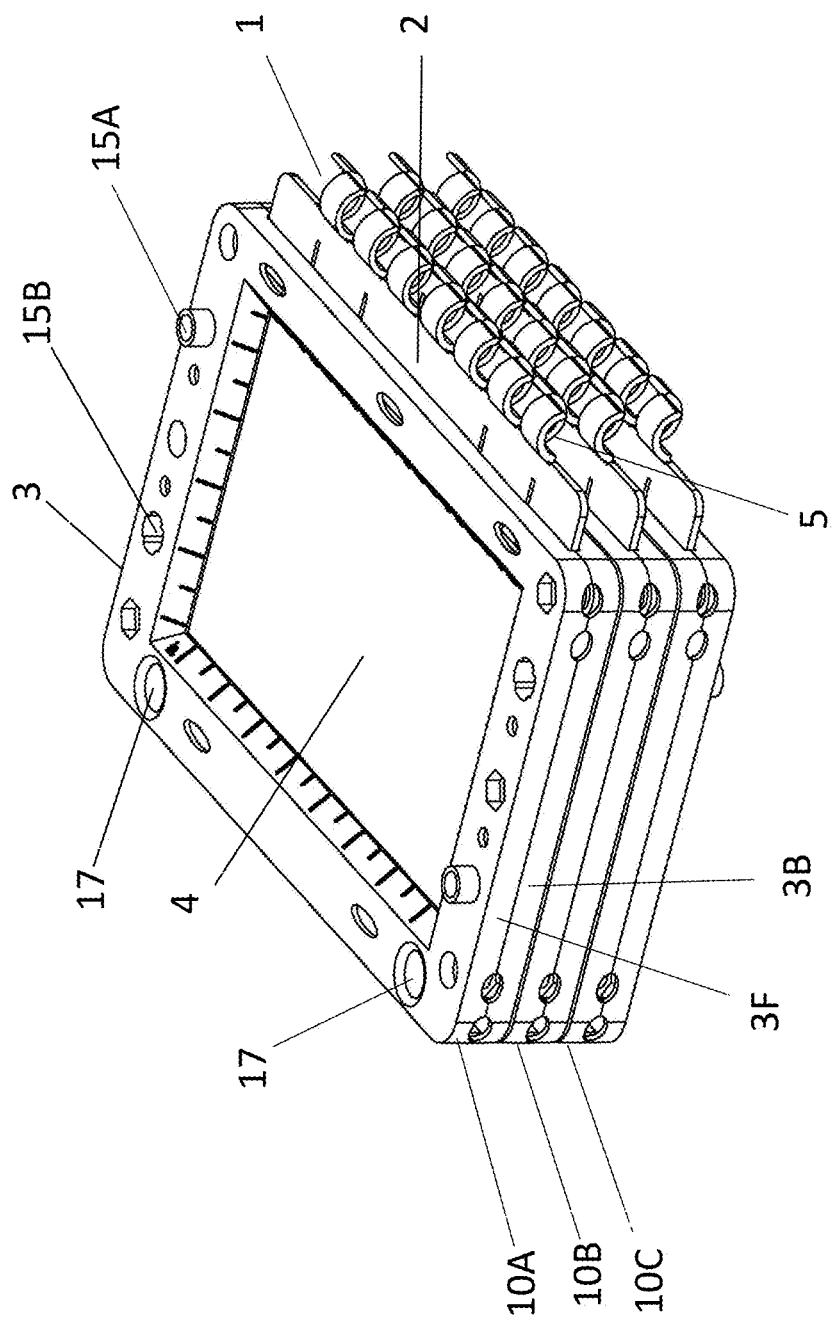
FIG. 4 shows a perspective view of multiple stacked units of the tablet device shown in FIG. 1.
Figure 5B:
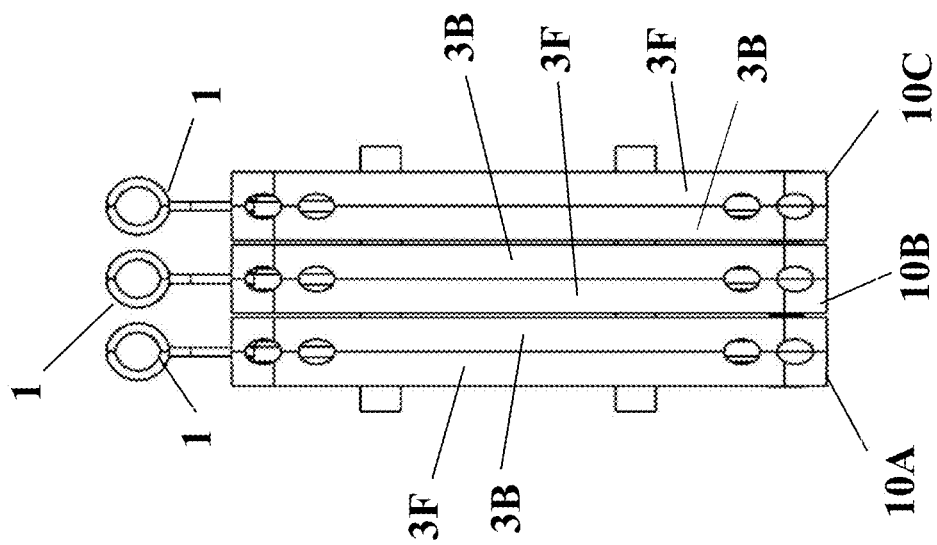
FIG. 5B shows a side view of the multiple stacked tablet device units shown in FIG. 4.
Figure 5A:
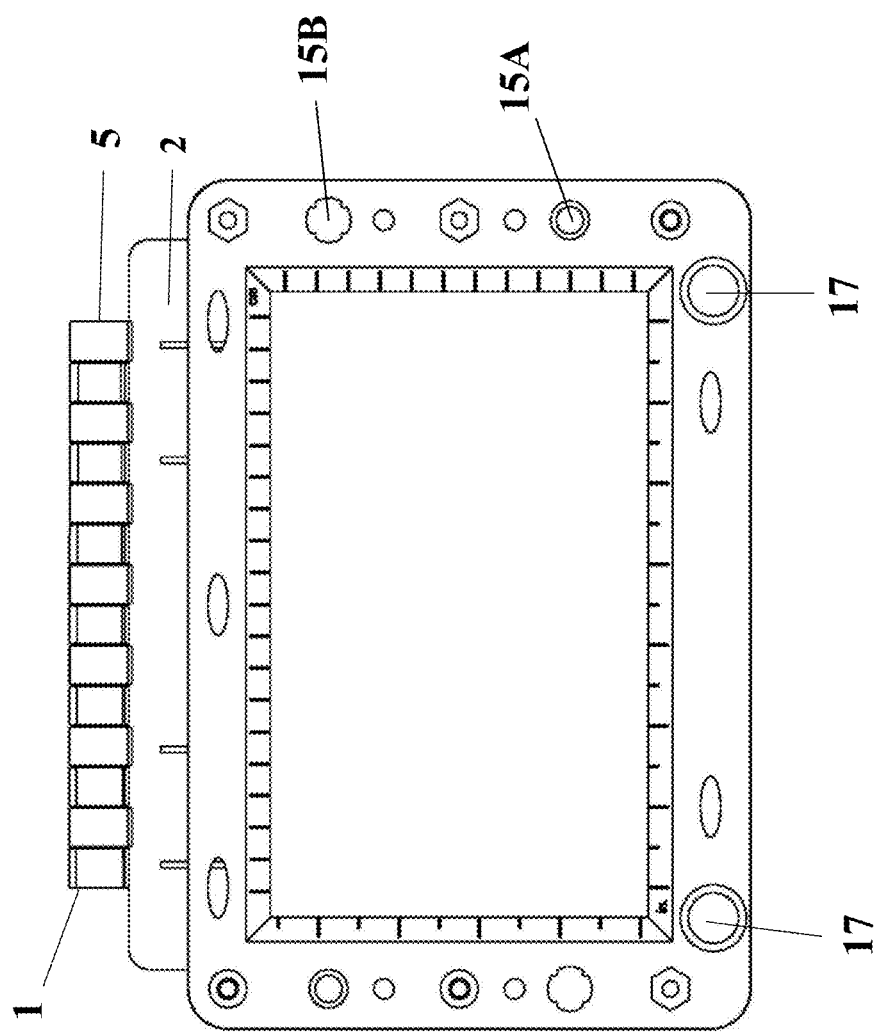
FIG. 5A shows a top view of the multiple stacked tablet device units shown in FIG. 4.

Further, in the example of FIG. 4, tablet device units 10A, 10B, 10C, each configured like the tablet device 10, are stacked on top of each other. As shown in FIGS. 4-5, each frame member amongst the front frame member 3F and the back frame member 3B of the tablet device units 10A, 10B, 10C can include connector receptacles 15B disposed at respective predetermined locations in a surface of the frame member, and each of the connector receptacles can be configured to receive a device connector 15A having a predetermined shape complementary to that of the connector receptacle. For example, a first tablet device unit 10A may be connected to a second tablet device unit 10B by a device connector 15A inserted in a connector receptacle 15B disposed in a surface of the front frame member 3F of the second tablet device unit 10B and another device connector 15A inserted in a connector receptacle 15B disposed in a back surface of the back frame member 3B of the first tablet device unit 10A. That is, the device connector 15 may be disposed in between tablet devices 10.

The tablet device unit 10A (as well as any of the other embodiments disclosed herein, and equivalents thereof) can alternatively or additionally include at least two-through holes 17 disposed near a distal edge 2d of each frame member amongst the front frame member 3F and the back frame member 3B of the tablet device units 10A-10C. Each of the through-holes 17 can be configured to be penetrated by a removable ring or tie-lock of a predetermined size (or smaller), and at least two removable rings or tie-locks may hold multiple tablet device units 10 together by penetrating through respective through-holes 17 of each of the multiple tablet device units included in a collection of tablet device units 10.

Now, another embodiment will be discussed with reference to FIGS. 6-10.

Figure 6:
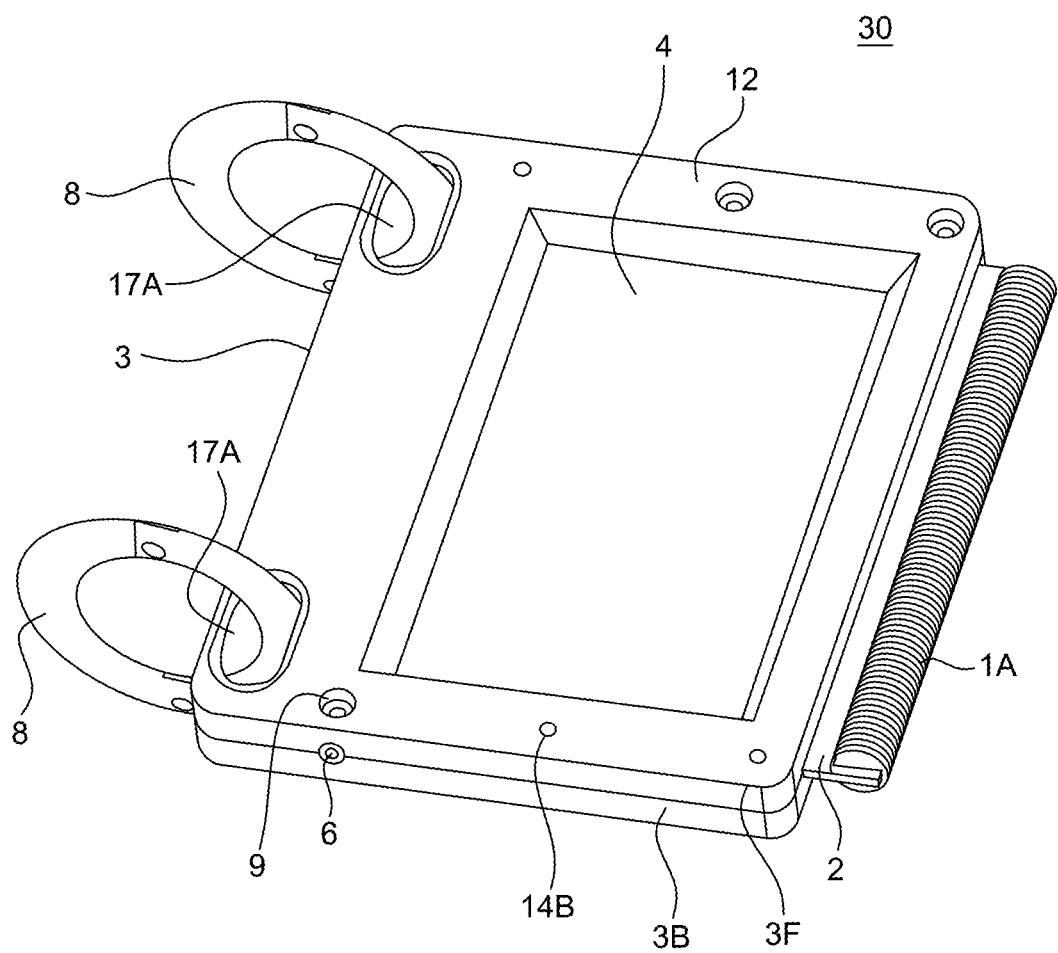
FIG. 6 shows a perspective view of a tablet device having through-holes through which respective rings (or equivalently, tie-locks) have been inserted, according to an embodiment.

In FIG. 6, handle 1A of tablet device 30 has a slotted arrangement and is not configured to be an implement holder. It should be appreciated that the handle can have any of various designs and is preferably configured to improve grip so as to make it easier to pull the support palette out from the tablet device.

Figure 7:
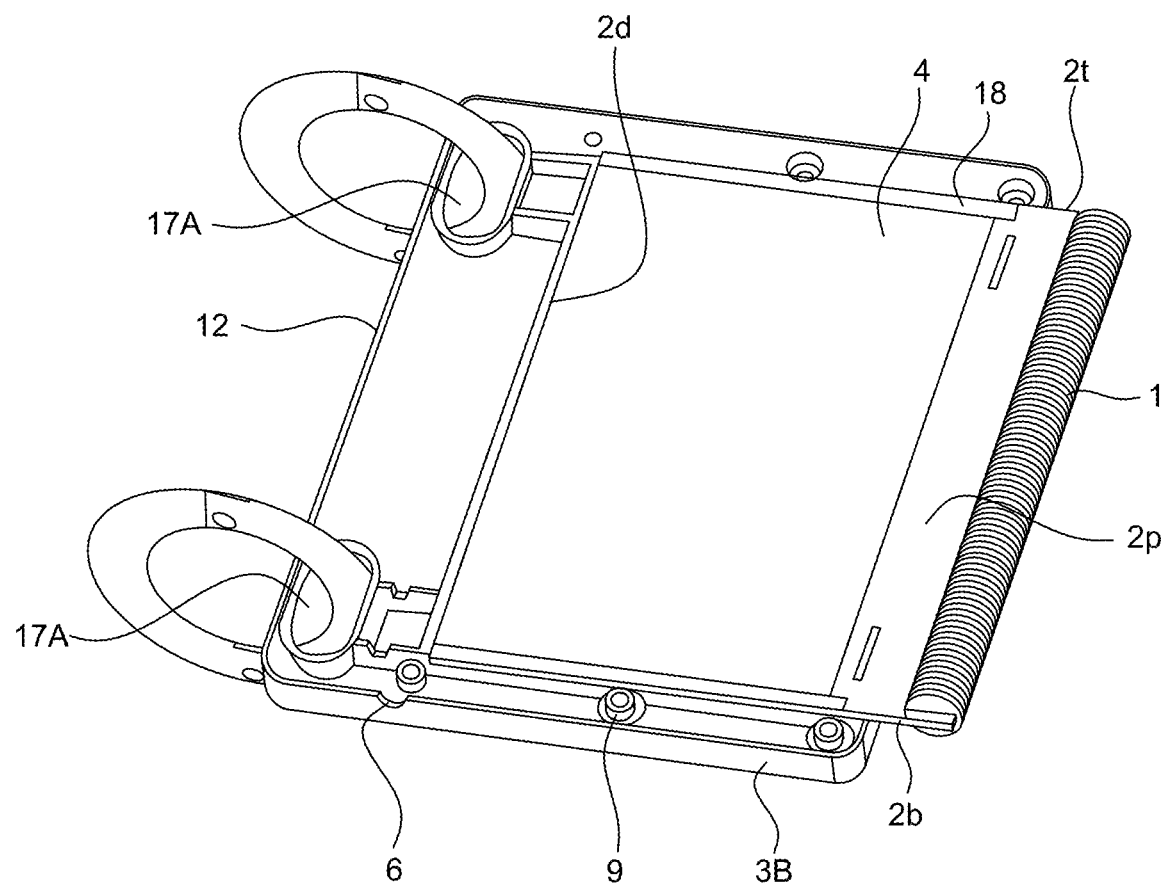
FIG. 7 shows a back frame member of the tablet device shown in FIG. 6.
Figure 8:
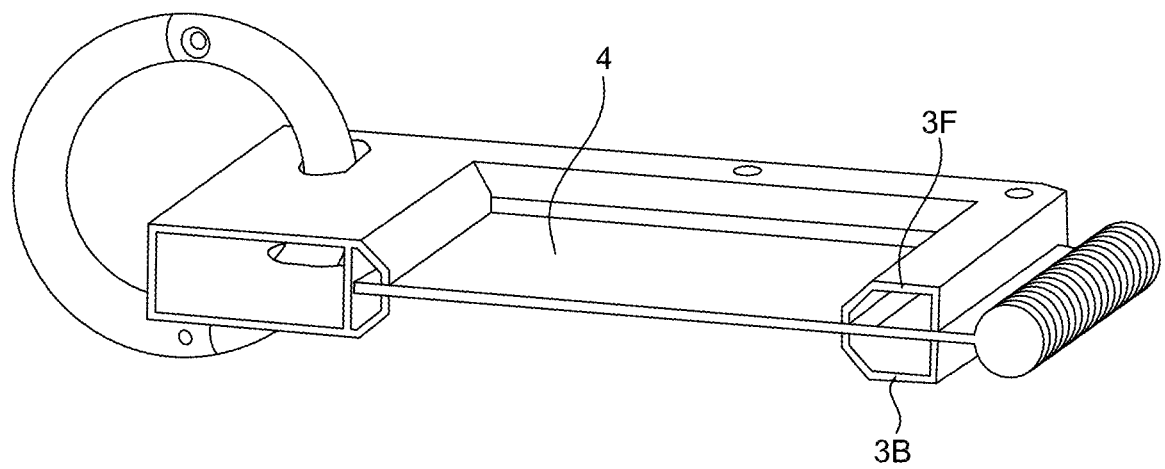
FIG. 8 shows a partial sectional view of the tablet device shown in FIG. 6.
Figure 10:
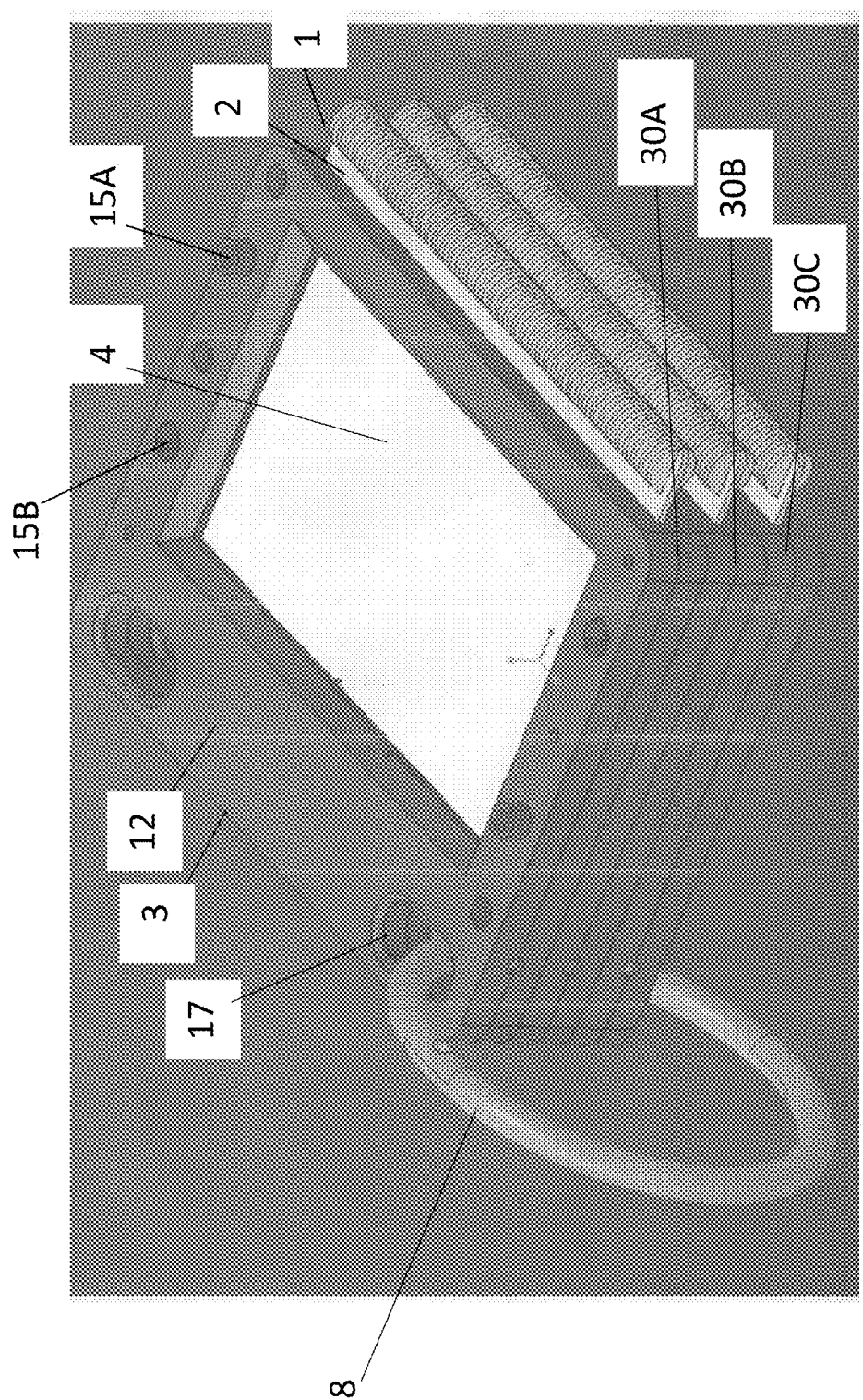
FIG. 10 shows multiple units coupled together of the tablet device shown in FIG. 6.
Figure 11:
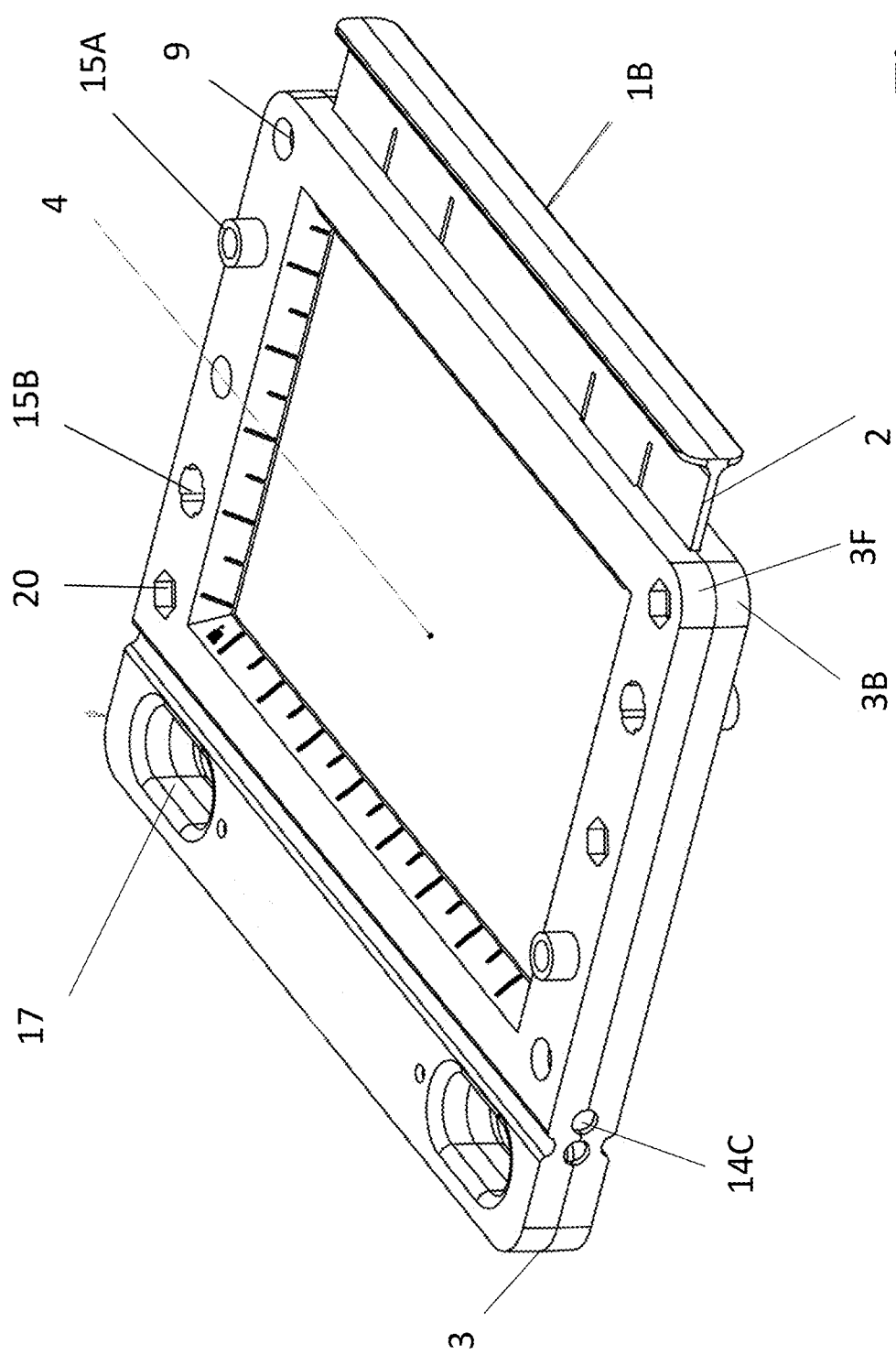
FIG. 11 shows a perspective view of a tablet device, according to an embodiment.
Figure 13A:
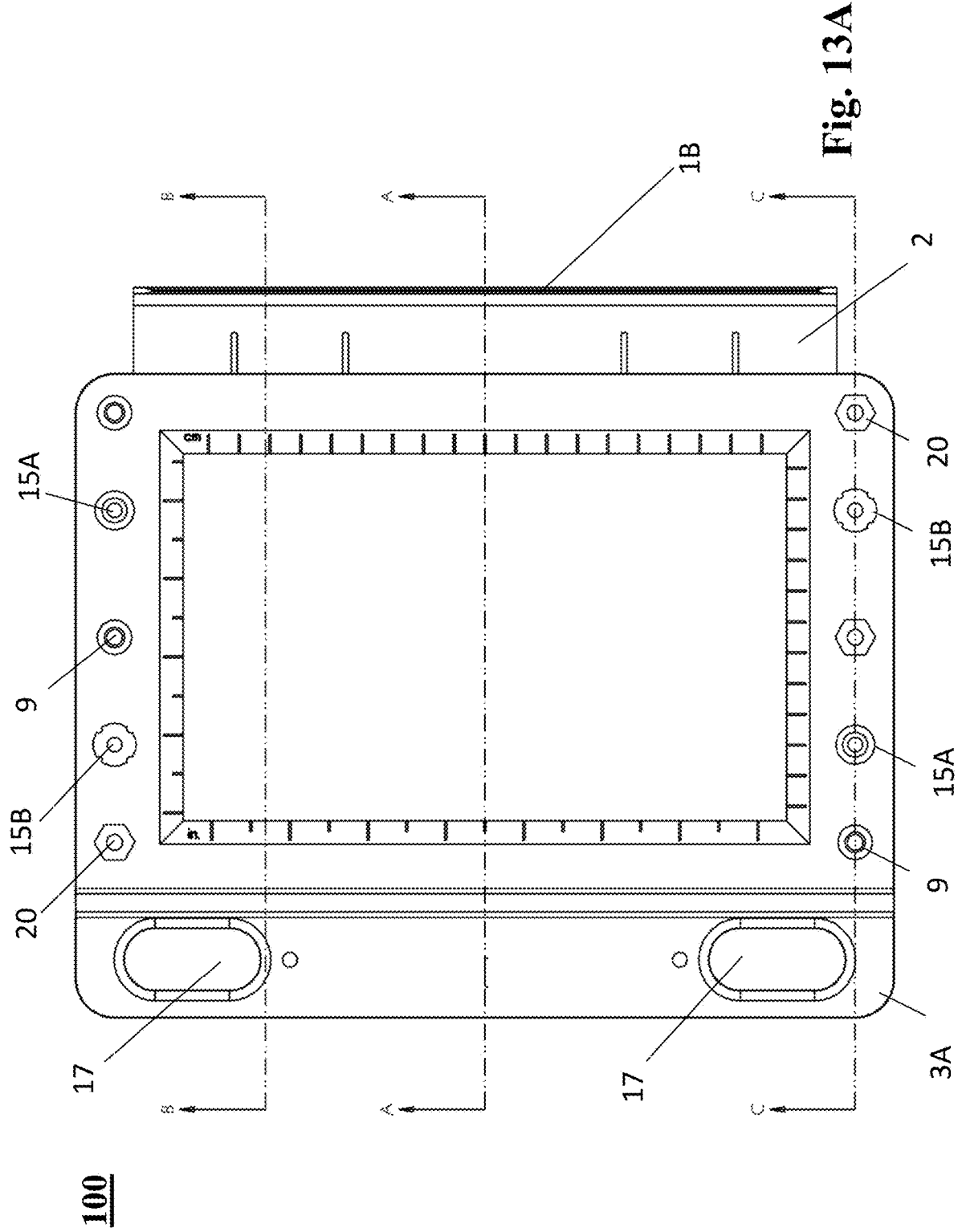
FIG. 13A shows a magnified top view of the tablet device shown in FIG. 11.
Figure 14A:
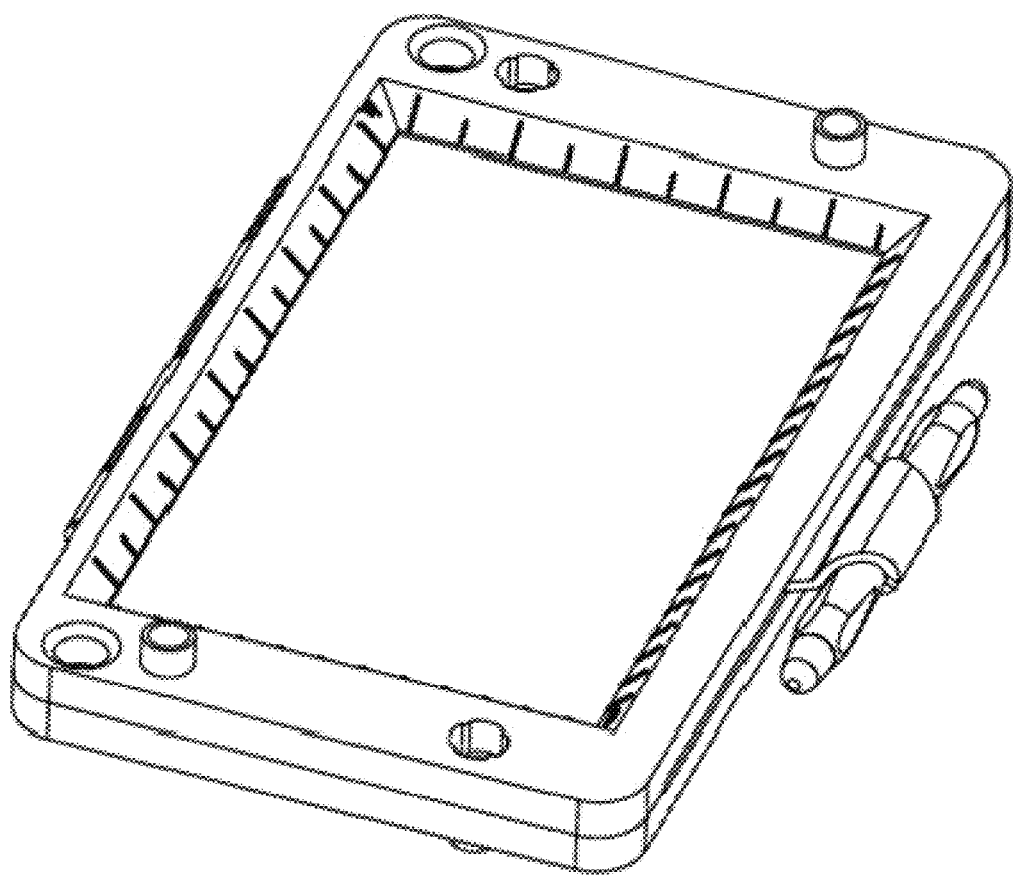
FIGS. 14A-14E show a tablet device, according to an additional embodiment in which front and back frame members having a clamshell-like configuration.
Figure 14B:
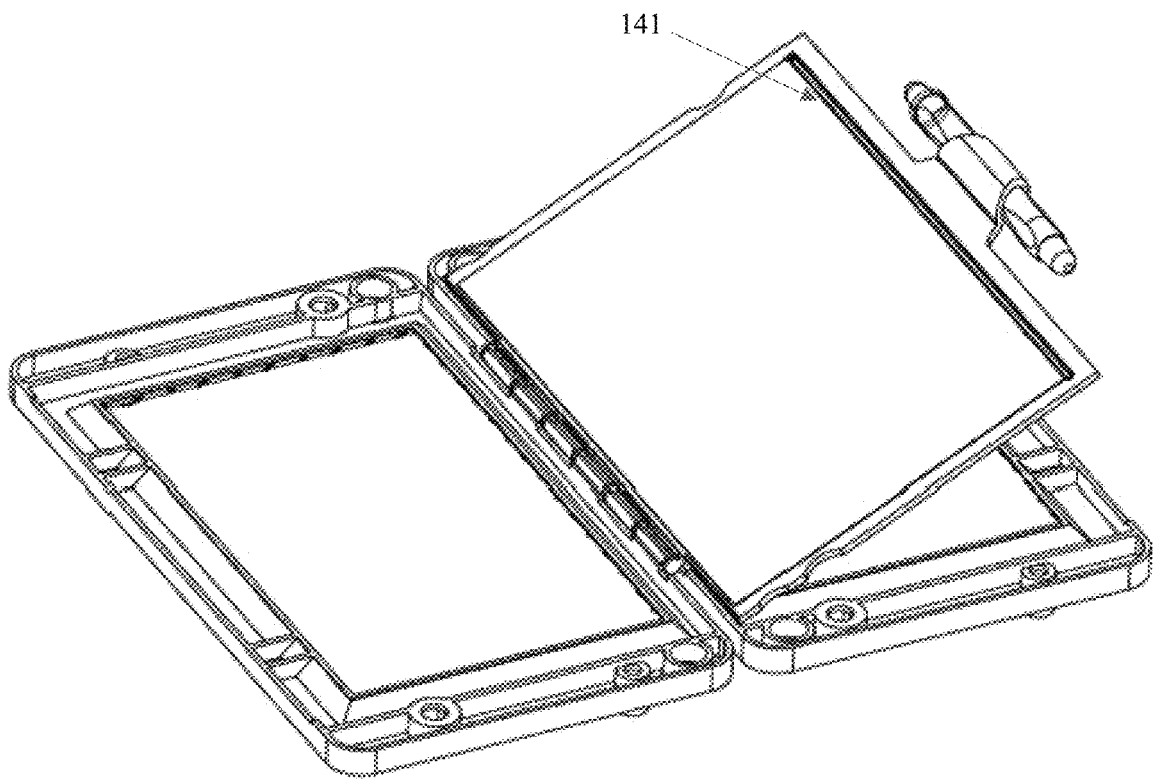
Figure 14C:
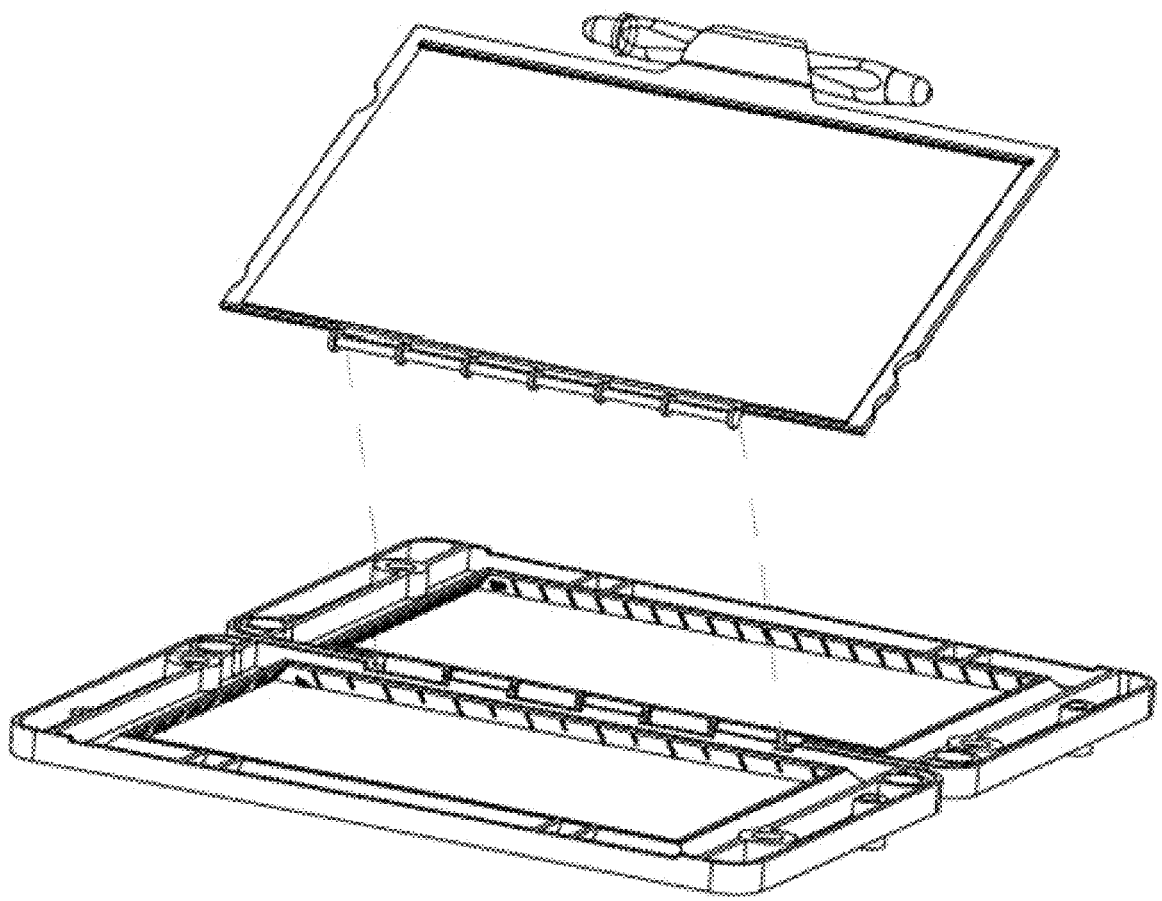
Figure 14D:
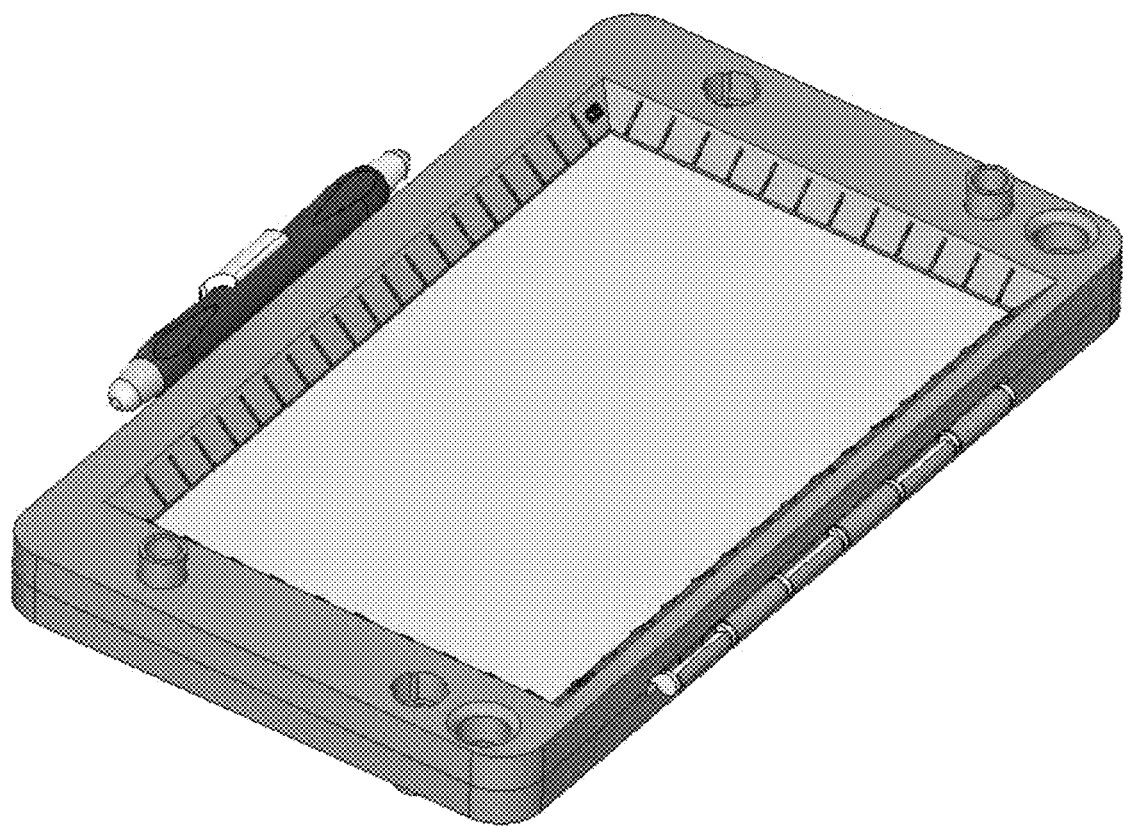
Figure 14E:
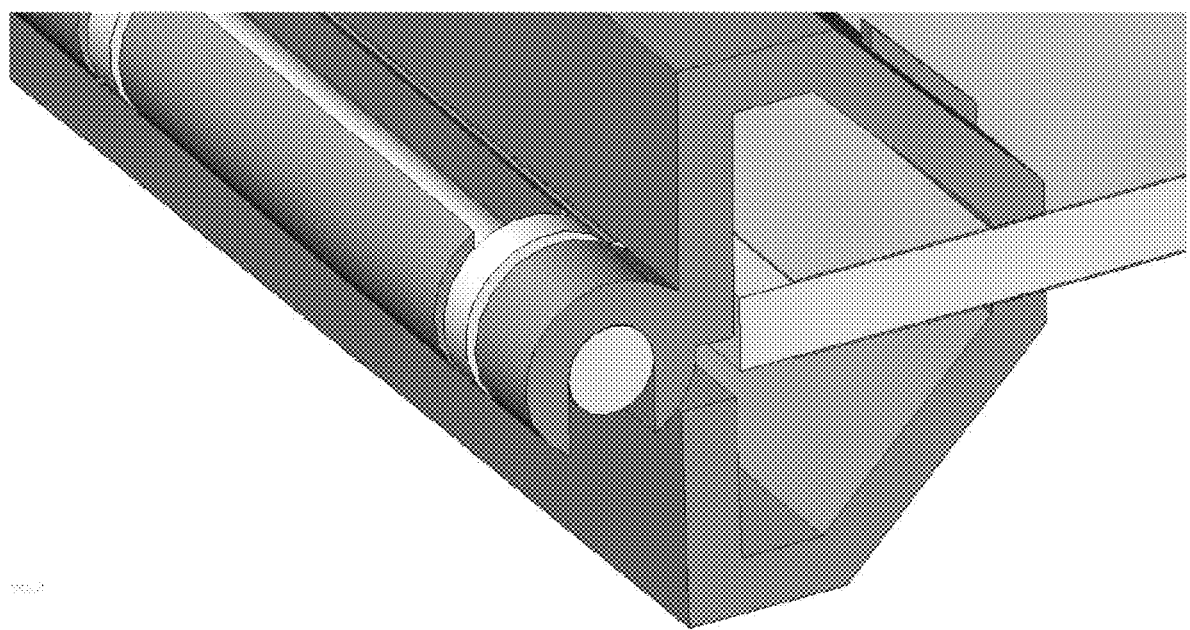

In FIG. 7, through-holes 17A in back frame member 3B of tablet device 30 are penetrated with respective removable rings 8 (i.e. when assembled, through-holes 17A in both of the front frame member 3F and back frame member 3B would be penetrated by the rings 8). However, as shown in FIG. 10, a single removable ring 8 (rather than multiple rings) may be employed (i.e. penetrate through a through-hole 17), particularly when each pair of adjacent tablet device units amongst multiple tablet device units 30A, 30B, 30C, etc., are secured to each other by insertion of a connector 15A in respective receptacles 15B of the adjacent units. Although the rings 8 have been discussed in connection with this embodiment, it should be noted that such rings 8 may be configured to penetrate the through-holes 17 in any of the embodiments disclosed herein. Further, it should be understood that in each instance, the rings 8 can be replaced by plastic tie-locks.

Figure 9:
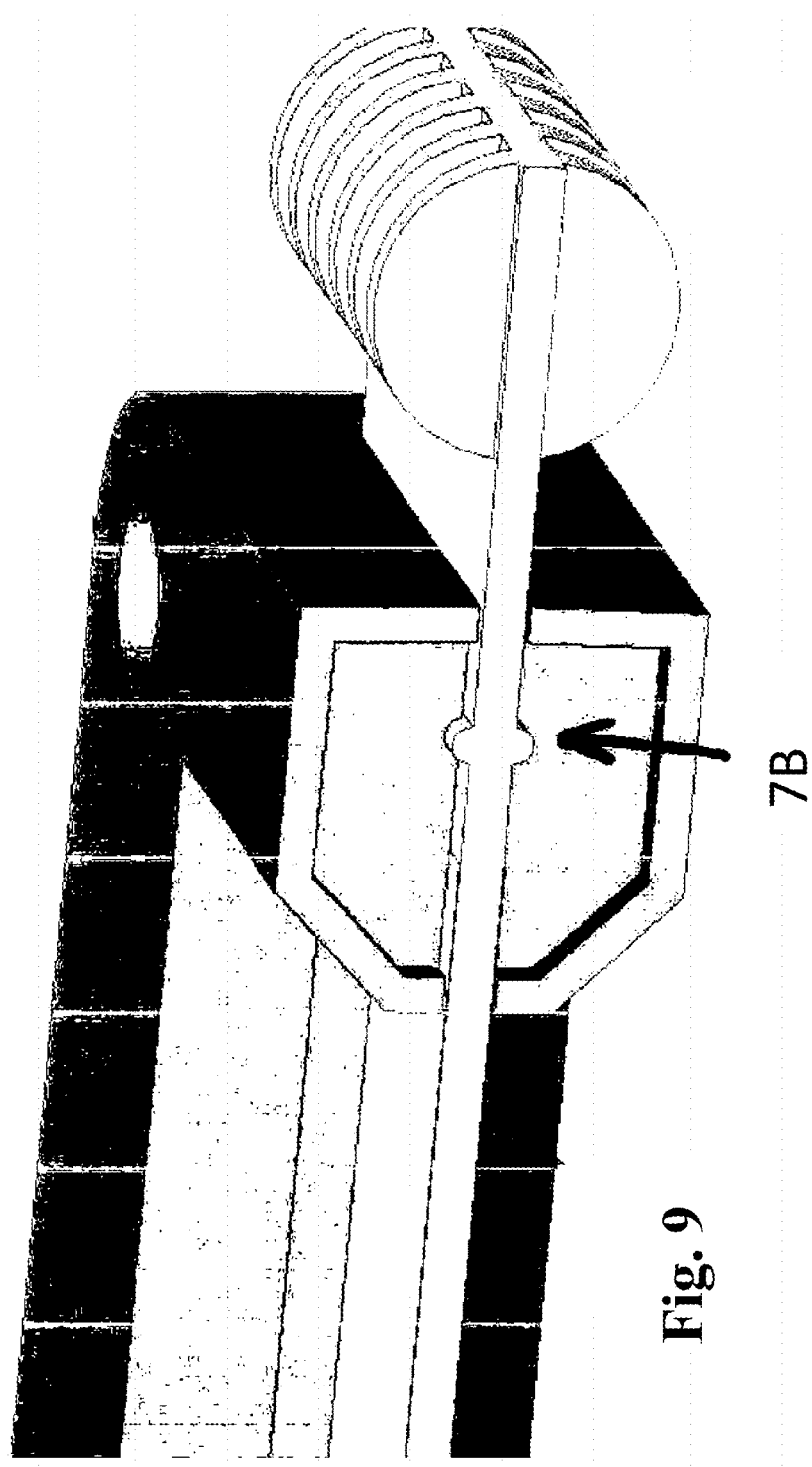
FIG. 9 shows a magnified view of a portion of the partial sectional view of the tablet device shown in FIG. 6, including a locking mechanism, according to an embodiment.

FIG. 9 shows the locking mechanism 7B (e.g., having multiple nubs 19) disposed on the support palette 2, and such locking mechanism may be utilized in a similar fashion the locking mechanism 7A.

Further, implement receptacle 5A may be configured to receive a writing implement of a predetermined shape and predetermined size, and may alternatively be disposed in the frame assembly 3 including the front frame member 3F and the back frame member 3B (e.g., the implement receptacle may be clipped onto the frame assembly 3 via apertures 14).

According to another embodiment, as shown in FIGS. 11-13D, handle 1B attached to the proximal side 2p of the support palette 2 of tablet device 100 has a T-like shape with a substantially flat face extending longitudinally (L) and faces away from the near side of the frame assembly having the slot portion 12. A pair of apertures 14C double as attachment points and as implement receptacles to receive a writing implement of a predetermined shape and predetermined size. A width W, length L and thickness T of the tablet device can be configured according to the intended use.

As discussed, with this device (e.g., tablet device 10, 30, 100) a person (e.g., a diver) can print on the waterproof synthetic sheet any information such as maps, checklists, templates, instructions, etc., in color or black and white using any consumer grade laser printer and then be able to access the information underwater. The device (10, 30, 100) can hold, for example, at least one 8.5×11" sheet of waterproof synthetic paper folded in half into two panels measuring 8.5"×11". The dimensions of the device and support palette should be selected to accommodate the waterproof synthetic sheet of a corresponding size, and therefore such dimensions of course may vary according to the dimensions of the typical sheet that would be employed for pre-printing the desired information.

The tablet device (e.g., 10, 10A-10C, 30, 100) can frame the folded paper holding it tight over a rigid back plate which can snap into the frame. Using rings or tie-locks, if needed, several of these tablets can be attached together to form a waterproof "book". Each frame can have attachment points (e.g., attachment point 6 in FIG. 6) on or near all four corners so that the tablets will snap together.

The new device functions as a kind of underwater clipboard that secures all the edges of the paper, holds it taut on a ridged surface and can accommodate multiple pages. The tablets can be ganged together to form a type of underwater "book". Each tablet can have attachment points that enable it to be "snapped" into the adjacent tablet behind it or in front of it. In this way multiple tablets can be rearranged so that the first becomes the last, and they can also be opened like a book to view two pages simultaneously.

Two clips may be added alongside of the handle 1B to hold the right edges of the paper as it is being withdrawn. The implement receptacle 5 (e.g., pencil holder) can be now incorporated into the handle 1B. The "lock and release" mechanism 7 can be a simple pressure fitting in the support palette 2. The handle 1B can be used to trigger the mechanism 7 that cab add a lock and release feature to prevent the sheet 4 from accidentally releasing during use.

An additional embodiment in which front and back frame members having a clamshell-like configuration is shown in FIGS. 14A-14E. In many instances, the front and back frame members enclosing the support palette and removable, waterproof note-recording medium (e.g., vellum) like a clamshell is preferable. An interlocking multi-way hinge that secures the right and left frames with the support palette and vellum enclosed in the center was added. On each of the frame members opposite from the hinge is a locking clasp to keep the vellum and support palette secure in the frame during use. A fresh vellum can be inserted, as needed, through the slot 141. Many of the aforementioned features are present in FIGS. 14A-14E.

For example, FIGS. 14A-14E shows an embodiment that support, for example, the following features:

- a support palette supporting a removable, waterproof note-recording medium sheet on a front surface of the support palette;
- a frame assembly including a front frame member and a back frame member, where each of the front frame member and the back frame member extends longitudinally beyond a top edge and a bottom edge of the support palette;
- the front frame member having a frame portion circumscribing an opening portion through which information recorded on an information-bearing portion of the waterproof note-recording medium sheet is to be visually discerned and through which the writing implement can contact the information-bearing portion of the waterproof note-recording medium sheet to apply notes or markings thereon;
- the removable, waterproof note-recording medium sheet is a sheet folded over an edge of the support palette and onto at least most of a back surface of the support palette;
- an inner perimeter edge of the frame portion circumscribing the opening portion is beveled, and the beveled edge is scored with marks separated by a predetermined unit of distance;
- the support palette is made of a phosphorescent material;
- the removable, waterproof note-recording medium sheet is a sheet of waterproof synthetic paper folded over the support palette to cover most of the front surface of the support palette and most of the back surface of the support palette;
- the front and back frame members hold the sheet of waterproof synthetic paper securely in place on the front and back surfaces, respectively, of the support palette;
- plural apertures are provided on a surface of, and into, the front frame member and back frame member of the frame assembly to permit air bubbles to escape from the frame assembly.

the sheet of waterproof synthetic paper folded over the support palette covers most of the front surface of the support palette and most of the back surface of the support palette;

the front and back frame members hold the sheet of waterproof synthetic paper securely in place on the front and back surfaces, respectively, of the support palette, when the support palette bearing the sheet of waterproof synthetic paper has been inserted in the frame assembly.

an inner perimeter edge of the frame portion circumscribing the opening portion is beveled, and the beveled edge is scored with marks separated by a predetermined unit of distance; etc.

The embodiments described herein are illustrative, and many variations can be introduced to these embodiments without departing from the spirit of the disclosure. For example, elements and/or features of different examples and illustrative embodiments may be combined with each other and/or substituted for each other within the scope of this disclosure and appended claims.

What is claimed is:

1. A tablet device configured for an underwater or extreme environment, comprising:
   a support palette to support a removable, waterproof note-recording medium sheet on a front surface of the support palette; and
   a frame assembly including a front frame member and a back frame member, each of the front frame member and the back frame member extending longitudinally beyond a top edge and a bottom edge of the support palette,
   the front frame member having a frame portion circumscribing an opening portion through which information recorded on an information-bearing portion of the waterproof note-recording medium sheet is to be visually discerned and through which the writing implement can contact said information-bearing portion of the waterproof note-recording medium sheet to apply notes or markings thereon,
   wherein the removable, waterproof note-recording medium sheet is a sheet folded over an edge of the support palette and onto at least most of a back surface of the support palette.

2. The tablet device according to claim 1, wherein an inner perimeter edge of the frame portion circumscribing the opening portion is beveled, and the beveled edge is scored with marks separated by a predetermined unit of distance.

3. The tablet device according to claim 1, wherein the support palette is made of a phosphorescent material.

4. The tablet device according to claim 1, wherein the removable, waterproof note-recording medium sheet is a sheet of waterproof synthetic paper folded over the support palette to cover most of the front surface of the support palette and most of the back surface of the support palette, and the front and back frame members of the frame assembly are configured to hold the sheet of waterproof synthetic paper securely in place on the front and back surfaces, respectively, of the support palette, when the support palette bearing the sheet of waterproof synthetic paper has been inserted in the frame assembly.

5. The tablet device according to claim 4, wherein the sheet of waterproof synthetic paper folded over the support palette bears a pre-printed map on said information-bearing portion of the waterproof note-recording medium sheet, and the pre-printed map permits notes or messages or markings or sketches to be added via the writing implement onto the pre-printed map.

6. The tablet device according to claim 4, wherein the sheet of waterproof synthetic paper folded over the support palette bears a pre-printed checklist permitting notes or markings to be added via the writing implement onto the pre-printed checklist.

7. The tablet device according to claim 4, wherein the sheet of waterproof synthetic paper folded over the support palette bears one or more templates for matching objects or terrain that the user is likely to encounter on a dive, permitting notes or markings to be added via the writing implement onto the templates.

8. The tablet device according to claim 4, wherein the sheet of waterproof synthetic paper folded over the support palette bears instructions permitting notes or messages or markings or sketches to be added via the writing implement onto the pre-printed instructions.

9. The tablet device according to claim 1, wherein plural apertures are provided on a surface of, and into, the front frame member and back frame member of the frame assembly to permit air bubbles to escape from the frame assembly.

10. A tablet device configured for an underwater or extreme environment, comprising:
    a support palette to support a removable, waterproof note-recording medium sheet on a front surface of the support palette; and
    a frame assembly including a front frame member and a back frame member, each of the front frame member and the back frame member extending longitudinally beyond a top edge and a bottom edge of the support palette,
    the front frame member having a frame portion circumscribing an opening portion through which information recorded on an information-bearing portion of the waterproof note-recording medium sheet is to be visually discerned and through which a writing implement can contact said information-bearing portion of the waterproof note-recording medium sheet to apply notes or markings thereon,
    wherein the removable, waterproof note-recording medium sheet is a sheet of waterproof synthetic paper folded over the support palette to cover most of the front surface of the support palette and most of the back surface of the support palette, and the front and back frame members of the frame assembly are configured to hold the sheet of waterproof synthetic paper securely in place on the front and back surfaces, respectively, of the support palette, when the support palette bearing the sheet of waterproof synthetic paper has been inserted in the frame assembly.

11. The tablet device according to claim 10, wherein the sheet of waterproof synthetic paper folded over the support palette bears a pre-printed map on said information-bearing portion of the waterproof note-recording medium sheet, and the pre-printed map permits notes or messages or markings or sketches to be added via the writing implement onto the pre-printed map.

12. The tablet device according to claim 10, wherein the sheet of waterproof synthetic paper folded over the support palette bears a pre-printed checklist permitting notes or markings to be added via the writing implement onto the pre-printed checklist.

13. The tablet device according to claim 10, wherein the sheet of waterproof synthetic paper folded over the support palette bears one or more templates for matching objects or terrain that the user is likely to encounter on a dive, permitting notes or markings to be added via the writing implement onto the templates.

14. The tablet device according to claim 10, wherein the sheet of waterproof synthetic paper folded over the support palette bears instructions permitting notes or messages or markings or sketches to be added via the writing implement onto the pre-printed instructions.

15. The tablet device according to claim 10, wherein an inner perimeter edge of the frame portion circumscribing the opening portion is beveled, and the beveled edge is scored with marks separated by a predetermined unit of distance.

* * * * *